(12) United States Patent
Bronola

(10) Patent No.: US 11,934,896 B2
(45) Date of Patent: Mar. 19, 2024

(54) MULTIPLATFORM MICROSERVICE CONNECTION TECHNIQUES

(71) Applicant: NCR Voyix Corporation, Atlanta, GA (US)

(72) Inventor: Alexander Arrabis Bronola, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/966,348

(22) Filed: Oct. 14, 2022

(65) Prior Publication Data

US 2023/0053100 A1     Feb. 16, 2023

Related U.S. Application Data

(63) Continuation of application No. 17/005,562, filed on Aug. 28, 2020, now Pat. No. 11,513,875.

(51) Int. Cl.
  *G06F 9/54*     (2006.01)
  *G06F 9/22*     (2006.01)
  (Continued)

(52) U.S. Cl.
  CPC ............... *G06F 9/544* (2013.01); *G06F 9/22* (2013.01); *G06F 9/44526* (2013.01);
  (Continued)

(58) Field of Classification Search
  CPC .......... G06F 9/541; G06F 9/544; G06F 9/546; G06F 9/547; G06F 9/44526; G06Q 20/1085; G06Q 20/18; G06Q 20/20
  See application file for complete search history.

(56) References Cited

U.S. PATENT DOCUMENTS 11,457,080 B1 *   9/2022   Meduri ................. H04L 67/60
11,513,875 B2 *   11/2022  Bronola ................ G06F 9/547
(Continued)

FOREIGN PATENT DOCUMENTS

| CN | 107861859 A | 3/2018 |
| CN | 109246251 A | 1/2019 |
| CN | 109144660 A | 4/2019 |

OTHER PUBLICATIONS

CN Search Report—dated Dec. 20, 2022 and English Machine Translation thereof.

*Primary Examiner* — Brian W Wathen
(74) *Attorney, Agent, or Firm* — Schwegman Lundberg & Woessner, P.A.

(57) ABSTRACT

Inter-microservice communications are managed through in-memory connection routing. A sending microservice writes a message over a port associated with the connection. The message is routed directly to one or more receiving microservices associated with the connection over their ports associated with the connection. The message may be converted to a different format or multiple different formats through plugins processed when the message is received over the sending microservice's port and before the converting messages are routed over the receiving microservices' ports. The inter-microservice communications are hardware and platform independent or agnostic, such that the microservices associated with the connection can be processed on different hardware and different platforms from one another.

16 Claims, 4 Drawing Sheets

(51) Int. Cl.
  *G06F 9/445* (2018.01)
  *G06Q 20/10* (2012.01)
  *G06Q 20/18* (2012.01)
  *G06Q 20/20* (2012.01)

(52) U.S. Cl.
  CPC ......... *G06F 9/546* (2013.01); *G06Q 20/1085* (2013.01); *G06Q 20/18* (2013.01); *G06Q 20/20* (2013.01)

(56) References Cited

U.S. PATENT DOCUMENTS

| | | |
|---|---|---|
| 2017/0346768 A1 | 11/2017 | Wise et al. |
| 2019/0265986 A1* | 8/2019 | Mathur .................. G06F 13/38 |
| 2020/0097391 A1* | 3/2020 | Chunduri ................ H04L 67/51 |

\* cited by examiner

MULTIPLATFORM MICROSERVICE CONNECTION TECHNIQUES

CROSS-REFERENCE TO RELATED APPLICATION

This application is a continuation of U.S. patent application Ser. No. 17/005,562, filed Aug. 28, 2020, which application and publication is incorporated herein by reference in its entirety.

BACKGROUND

Microservices are associated with a computing architecture that structures a single application/service as a collection of loosely coupled services. This allows each of microservices that represents the single application/service to be independently deployed even when the overall single application/service is complex. Microservices are also easy to maintain and to test. Each microservice provides fine-grain functionality associated with a portion of the single application/service. Each microservice is loosely coupled to the other microservices because the degree of dependence between the microservices associated the single application/service is small and substantially smaller than what is associated with the coupling/dependencies between the original functions of the original single application/service.

Unsurprisingly, enterprises are migrating their applications/services architectures and newly provided services to be provided to their customers over networks as microservices.

One concern with microservices is the ability to achieve fast and efficient communication between the microservices, since what was previously a single/application or service executing on a single device will now be a collection of individual services each of which may be executing on different devices across a network. So, microservice communications may span multiple devices over a network whereas a single monolithic application/service communicates within memory of a single device.

Consequently, microservices typically utilize pipe-based communications, which opens a connection in memory on a server/device between the microservices where data can be read by, written to, and routed to microservices.

The problem with existing pipe-based utilities is that they are platform specific (e.g., Operating System (OS) specific), which means that two microservices that need to communicate with one another have to both be processing on a same platform. Another problem with existing pipe-based utilities is that the pipe is only able to handle one data format through one plugin. That is, any data format changes between microservices has to be handled through a pipe having a single plugin that is called within the memory pipe; the single plugin translates a message in a sending microservice's format to a receiving microservice's needed format. So, existing pipe-based utilities are platform and message data format-conversion specific, since just a single plugin is capable of being used within any given instantiated pipe on the server/device.

This is a problem in the industry for any enterprise desiring to migrate to a microservice architecture because the enterprise may have many different platforms and many different application or data formats that need to be used to effectively and efficiently deliver their services to their customers.

SUMMARY

In various embodiments, methods and a system for multiplatform microservice connection techniques are presented.

According to an embodiment, a method for multiplatform microservice connection techniques is presented. As an example, an in-memory connection is established between microservices associated with multiple platforms. A message is received from a sending microservice associated with a first platform during the connection. At least one plugin associated with at least one second platform is called to translate the message from a first format to at least one second format. The message is routed through the in-memory connection in the at least one second format to at least one receiving microservice associated with the at least one second platform.

DETAILED DESCRIPTION

Figure 1A:
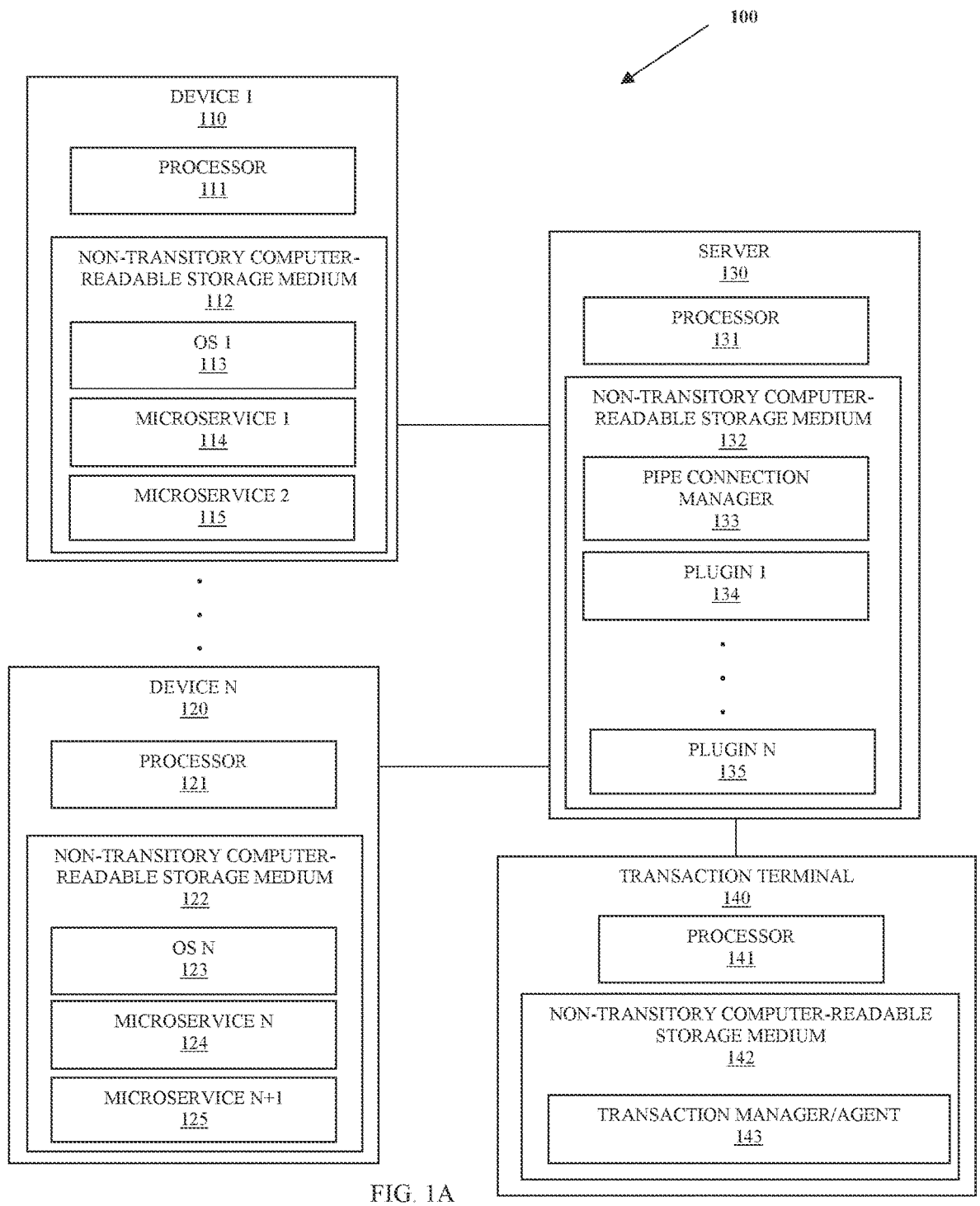
FIG. 1A is a diagram of a system for multiplatform microservice connection techniques, according to an example embodiment.

FIG. 1A is a diagram of a system 100 for multiplatform microservice connection techniques, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of multiplatform microservice connection techniques presented herein and below.

As will be discussed in greater detail herein and below, system 100 permits inter microservice communications through in-memory routing across multiple disparate platforms (e.g., Operating Systems (OS's), Virtual Machines (VM's), containers, etc.). This is fast and efficient. Furthermore, each message sent can be converted to any desired or needed custom output between the microservices through multiple plugins.

System 100 is presented within the context of transaction services provided to a transaction terminal 142 during transactions. This is one of many potential applications in the retail industry and is presented for purposes of illustration only; as it is to be noted that other applications may be used as well, such as and not limited to, financial applications, travel applications, hospitality applications, restaurant applications, and others.

As discussed herein and below, a "microservice" is one or more functions/operations decoupled from a particular service. The particular service is comprised of multiple functions/operations defined by multiple microservices cooperating with one another to provide the overall functions/operations of the particular service. The particular service may be a transaction service, a loyalty service, a reservation service, a payment service, and/or a security service. The particular service is processed from or initiated at a Point-of-Sale (POS) terminal, a Self-Service Terminal (SST), an Automated Teller Machine (ATM), and/or a kiosk. The particular service is decomposed into loosely coupled operations that comprise the cooperating microservices. Each microservice may process on a same or different computing device from remaining ones of of combinations of the microservices. Each device that processes one or more of the microservices may be a server, a VM, a container, the terminal where the particular service was initiated, or any other computing device. In this manner, the functions/operations of the particular service are distributed by the cooperating microservices over multiple devices, a same device, or combinations of these. Furthermore, each microservice may natively execute on a same or different platform from remaining ones of the microservices. In this way, the microservices are device and platform independent or agnostic.

System 100 comprises 1 to N devices (110, 120), a server 130, and a transaction terminal 140. Each of 110, 120, 130, and 140 comprise a corresponding processor (111, 121, 131, and 141) and a corresponding non-transitory computer-readable storage medium (112, 122, 132, and 142) having executable instructions for OS 1 113, microservice (MS) 1 114, MS 2 115, OS N 123, MS N 124, MS N+1 124, pipe connection manager 133, plugin 1 134, plugin N 135, and transaction manager/agent 143. When the corresponding executable instructions are executed by the corresponding processor (111, 121, 131, and 141) from the corresponding medium (112, 122, 132, and 142), this causes the corresponding processor (111, 121, 131, and 141) to perform the operations discussed herein and below for OS 1 113, microservice (MS) 1 114, MS 2 115, OS N 123, MS N 124, MS N+1 124, pipe connection manager 133, plugin 1 134, plugin N 135, and transaction manager/agent 143.

Transaction terminal 140 provides one or more services for a transaction initiated on terminal 140. Each service comprising some combinations of MS's (114, 115, 124, and/or 125). For example, the transaction may include a security service, a transaction service, a loyalty service, and a payment service. To provide the operations for each service, multiple ones of the MS's (114, 115, 124, and/or 125) require communication with one another. That is, messages are sent between the MS's (114, 115, 124, and/or 125) as output and other messages are read as input by the MS's (114, 115, 124, and/or 125).

Pipe connection manager 133 establishes and manages in-memory pipe connections between the MS's (114, 115, 124, and/or 125) from server 130 during the transaction. The Pipe connection manager 133 receives messages being written over a writing MS's port established for a given connection and routes the written messages directly to the receiving MS's port established for the given connection. Pipe connection manager 133 can manage the in-memory connections as 1-1 connections, 1-many connections, and/or many-to-many connections between the MS's (114, 115, 124, and/or 125).

Pipe connection manager 133 maintains a unique identifier for each instance or thread of each MS (114, 115, 124, and 125). Each unique identifier is assigned a port number for communication during a given connection. Pipe connection manager 133 maintains an in-memory mapping or database that permits rapid discovery of a needed port number for a given connection. In this way, as a sending MS (114, 115, 124, and 125) writes output to a connection, the output is rapidly routed to the appropriate receiving MS's (114, 115, 124, and 125) over their ports associated with the connection. Moreover, the in-memory mapping or database may identify a plugin identifier for a needed plugin (134 and/or 135). Any needed plugin (134 and/or 135) for a specific receiving MS (114, 115, 124, and 125) during the connection is called by pipe connection manager 133. The output of any called plugin (134 and/or 135) comprises the original output message produced by the sending MS (114, 115, 124, and 125) translated or converted into a different data format from that which was original associated with the output message. The different data format produced from each called plugin (134 and/or 135) represents a target data format that is needed by the corresponding receiving MS (114, 115, 124, and 125). The outputs from any called plugin (134 and/or 135) is routed by Pipe connection manager 133 to the appropriate port numbers that the corresponding receiving MS's are listening over during the transaction.

Conventionally, only a single plugin was capable of being called by existing pipe-based utilities. System 100 permits integration of 1, 2, or N plugins (134 through 135), where N is any needed number of plugins with no set upper limit.

Additionally, pipe connection manager 133 is OS agnostic, which means some MS's (114 and 115) may utilize a first OS 1 113 associated with a first type of OS where other MS's (124 and 125) may utilize a second OS N associated with a second type of OS. The different OS's 113 and 123 may be of different types or may be of a same type but different versions/releases of the same type of OS. It is to be noted that in some cases and embodiments, OS 1 113 and OS N 123 may be of a same type and version/release of an OS. In this way, the platforms of the MS's (114, 115, 124, and 125) are agnostic and pipe connection manager 133 can establish and manage connections between the MS's (114, 115, 124, and 125) regardless of the platforms associated with each of the MS's (114, 115, 124, and 125).

In an embodiment, the pipe connection manager 133 is written in code as a JAVA® script, which is capable of running in any existing OS platform and is extendible through community-based npm libraries. The pipe connection manager only needs to be added to registry settings of server 130 once. Additions of plugins (134 and 135) can be handled through config.json file as follows:

```
{
  "postCmd": "node postscript.js",
  "comment1" : "the format of the plugin is, {filename: msgIds}
  where msg Ids are where you want to subscribe to.",
  "plugins" : [
  {"redis_plugin": "B1"},
  {"gRPC_plugin": "B1,B2"},
  {"socketIO_plugin": "B1,B3"},
  {"webService_plugin": ""}
  ]
}
```

System 100 permits multiplatform inter MS communications that can accept and apply multiple plugins (134 and 135) at the same time. New plugins (134 or 135) can easily be added. In an embodiment, a Command Line Interpreter is provided that enables sending test messages from a command prompt to test message sending between MS's (114, 115, 124, and 125). In an embodiment, a configurable post load command is provided that can be called after sending of any test messages, which permits customized scripts using results of the test messages.

Figure 1B:
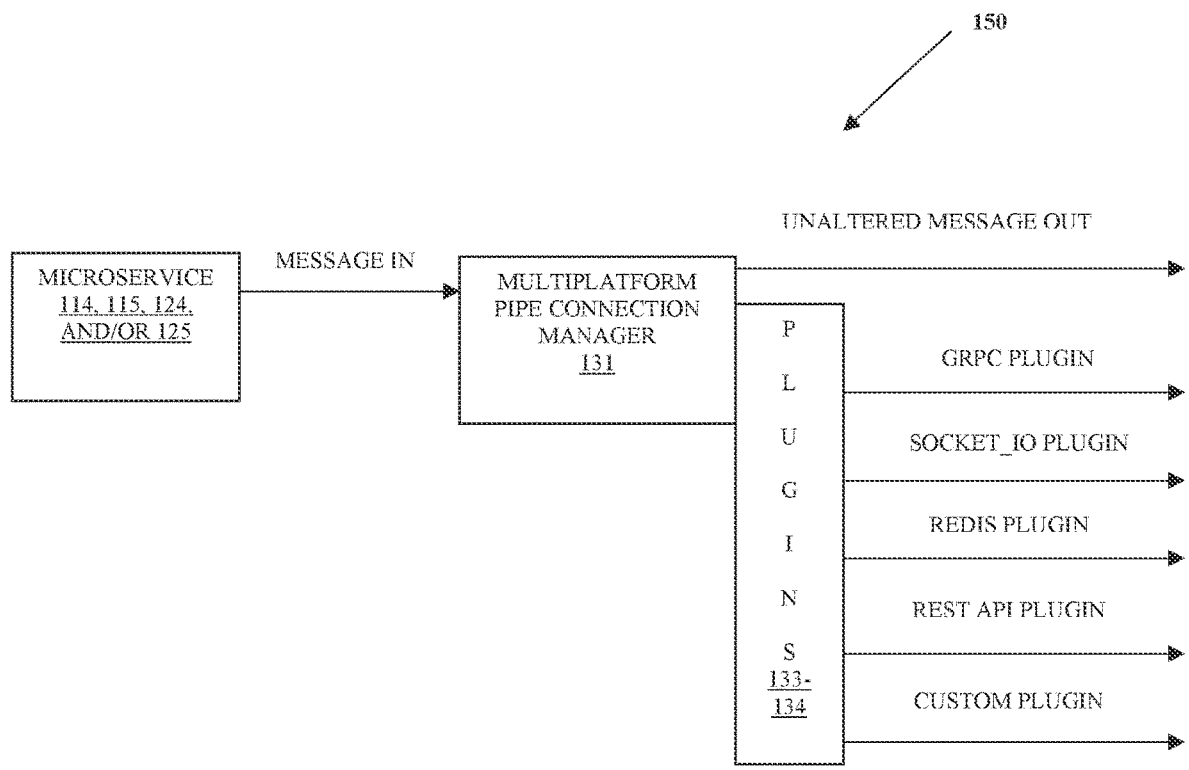
FIG. 1B is a diagram illustrating a process flow for the system of FIG. 1A, according to an example embodiment.

FIG. 1B is a diagram illustrating a process flow 150 for the system of FIG. 1A, according to an example embodiment.

Transaction manager/agent 143 initiates a transaction on terminal 140 for a particular service or set of services needed for the transaction. This causes multiplatform pipe connection manager 131 to instantiate instances of the needed MS's (114, 115, 124, 125), each instance having a unique TCP/IP address or identifier, which is maintained in-memory by pipe connection manager 131 within an in-memory mapping or in-memory database that assigns port numbers for communicating with each of the MS's (114, 115, 124, and 125) with each address or identifier. As each MS (114, 115, 124, and 125) processes to deliver the particular service or set of services for the transaction, output messages produced by each MS (114, 115, 124, and 125) is sent through a connection maintained by pipe connection manager 131. The output messages are written to memory over the ports assigned to each sending MS (114, 115, 124, and 125). Pipe connection manager 131 utilizes the in-memory database or mapping to route the output messages for the connection to the corresponding ports of the receiving MS's (114, 115, 124, and 125), any plugin to convert the out message formats are called before performing the routing to the receiving MS's (114, 115, 124, and 125). The plugins (133 and 134) can comprise a gRPC plugin, a socket_IO plugin, a redis plugin, a REST API plugin, or any custom plugin. Moreover, there can be N plugins (133 and 134) integrated and called by pipe connection manager 131. N had no predefined upper limit.

It is to be noted that the total number of MS's (114, 115, 124, and 125) presented in FIG. 1A is not intended to be any limitation on the embodiments discussed herein. That is, a device may have just 1 MS, or a device may have N MS's. Still further, server 130 and/or terminal 140 may comprise some or all of the MS's. Moreover, the total number of devices needed for the MS's (114, 115, 124, and 125) is only intended to be illustrative as there may be fewer or more devices than what is depicted. It is to be emphasized that the device and platform of the MS's (114, 115, 124, and 125) do not alter the teachings presented herein as managing inter MS communications is both hardware independent and platform independent with the embodiments provided herein.

These and other embodiments are now discussed with reference to FIGS. 2-3.

Figure 2:
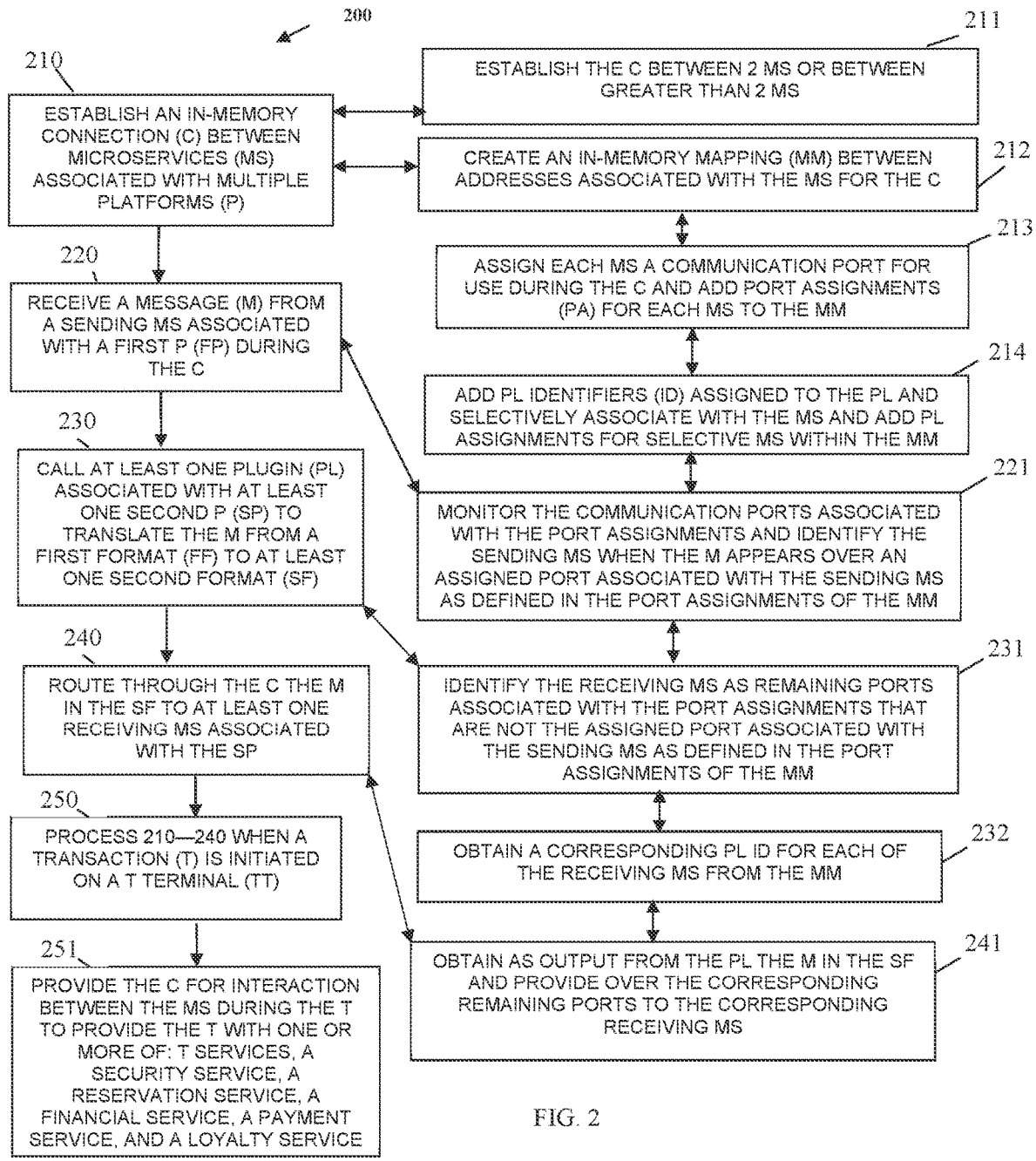
FIG. 2 is a diagram of a method for multiplatform microservice connection techniques, according to an example embodiment.

FIG. 2 is a diagram of a method 200 for multiplatform microservice connection techniques, according to an example embodiment. The software module(s) that implements the method 200 is referred to as a "microservice pipe connection manager." The microservice pipe connection manager is implemented as executable instructions programmed and residing within memory and/or a non-transitory computer-readable (processor-readable) storage medium and executed by one or more processors of a device. The processor(s) of the device that executes the microservice pipe connection manager are specifically configured and programmed to process the microservice pipe connection manager. The microservice pipe connection manager may have access to one or more network connections during its processing. The network connections can be wired, wireless, or a combination of wired and wireless.

In an embodiment, the device that executes the device microservice pipe connection manager is server 130. In an embodiment, server 130 is one of several servers that are logically cooperating over a network as a cloud processing environment (cloud).

In an embodiment, the microservice pipe connection manager is all of or some combination of 133-135.

At 210, the microservice pipe connection manager establishes an in-memory connection between MS's associated with multiple platforms.

In an embodiment, at 211, the microservice pipe connection manager establishes the in-memory connection between 2 MS's or between greater than 2 MS's.

In an embodiment, at 212, the microservice pipe connection manager creates an in-memory mapping between addresses or identifiers associated with the MS's for the in-memory connection. In an embodiment, the addresses or identifiers are thread specific or processing context specific.

In an embodiment of 212 and at 213, the microservice pipe connection manager assigns each MS a communication port for use during the in-memory connection and the microservice pipe connection manager adds port assignments for each MS to the in-memory mapping.

In an embodiment of 213 and at 214, the microservice pipe connection manager adds plugin identifiers for plugins and selective associates the plugin identifiers with the MS's. Furthermore, the microservice pipe connection manager adds plugin assignments for selective ones of the MS's within the in-memory mapping.

At 220, the microservice pipe connection manager receives a message from a sending MS associated with a first platform during the in-memory connection.

In an embodiment of 214 and 220, at 221, the microservice pipe connection manager monitors the communication ports associated with the port assignments and identifies the sending MS when the message appears over an assigned port associated with the sending MS as defined in the port assignments of the in-memory mapping.

At 230, the microservice pipe connection manager calls at least one plugin associated with at least one second platform to translate a first format of the message to at least one second format for the message.

In an embodiment of 221 and 230, at 231, the microservice pipe connection manager identifies the receiving MS as remaining ports associated with the port assignments that are not the assigned port which is associated with the sending MS and as is defined in the port assignments of the in-memory mapping.

In an embodiment of 231 and at 232, the microservice pipe connection manager obtains a corresponding plugin identifier for each of the receiving MS'S from the in-memory mapping.

At 240, the microservice pipe connection manager routes, through the in-memory connection, the message in the second formats to at least one receiving MS associated with the second platform.

In an embodiment of 232 and 240, at 241, the microservice pipe connection manager obtains as output from the plugins the message in the second formats and provides the message in the second formats over the corresponding remaining ports to the corresponding receiving MS's.

In an embodiment, at 250, the microservice pipe connection manager is initiated and processed when a transaction is initiated on a transaction terminal (POS terminal, ATM, SST, or kiosk).

In an embodiment of 250 and at 251, the microservice pipe connection manager provides the in-memory connection for interaction between the MS's during the transaction in order to provide the transaction with one or more of: a transaction service, a security service, a reservation service, a financial service, a payment service, and a loyalty service.

Figure 3:
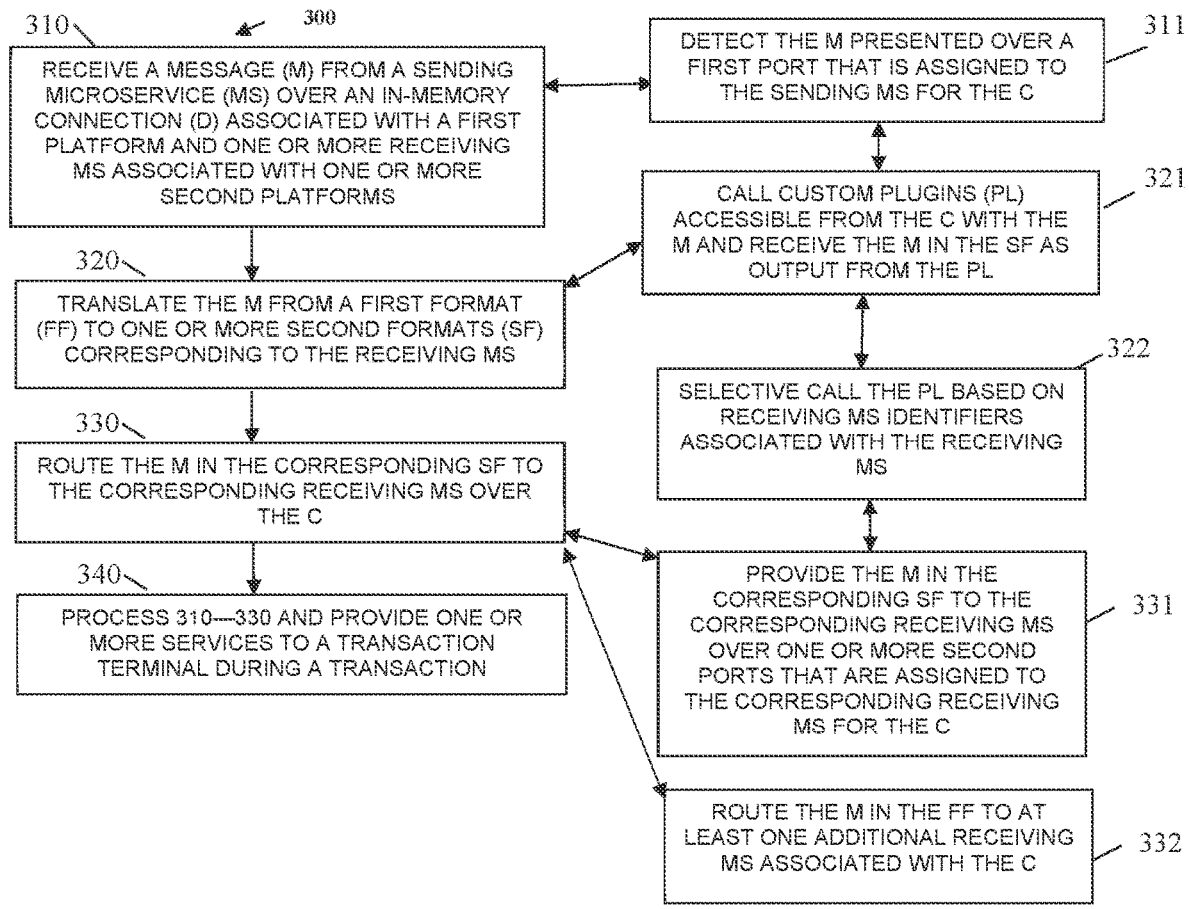
FIG. 3 is a diagram of another method for multiplatform microservice connection techniques, according to an example embodiment.

FIG. 3 is a diagram of another method 300 for multiplatform microservice connection techniques, according to an example embodiment. The software module(s) that implements the method 300 is referred to as an "inter-microservice communication router." The inter-microservice communication router is implemented as executable instructions programmed and residing within memory and/or a non-transitory computer-readable (processor-readable) storage medium and executed by one or more processors of a device. The processors that execute the inter-microservice communication router are specifically configured and programmed to process the inter-microservice communication router. The inter-microservice communication router may have access to one or more network connections during its processing. The network connections can be wired, wireless, or a combination of wired and wireless.

In an embodiment, the device that executes the inter-microservice communication router is the server 130. In an embodiment, server 130 is one of multiple servers that logically cooperate as a cloud processing environment (cloud).

In an embodiment, the inter-microservice communication router is all or some combination of 133-135 and/or the method 200.

The inter-microservice communication router presents another and, in some ways, enhanced processing perspective to that which was described above with the FIG. 2 and the method 200.

At 310, the inter-microservice communication router receives a message from a sending MS over an in-memory connection associated with a first platform and one or more receiving MS's associated with one or more second platforms.

In an embodiment, at 311, the inter-microservice communication router detects the message presented over a first port that is assigned to the sending MS for the in-memory connection.

At 320, the inter-microservice communication router translates the message from a first format to one or more second formats corresponding to the receiving MS's.

In an embodiment of 311 and 320, at 321, the inter-microservice communication router calls custom plugins accessible from the in-memory connection with the message and receives as the message in the second formats as output from the plugins.

In an embodiment of 321 and at 322, the inter-microservice communication router selectively calls the plugins based on receiving MSs' identifiers associated with the receiving MS's.

At 330, the inter-microservice communication router routes the message in the corresponding second formats to the corresponding receiving MS's over the in-memory connection.

In an embodiment of 322 and 330, at 331, the inter-microservice communication router provides the message in the corresponding second formats to the corresponding receiving MS's over one or more second ports that are assigned to the corresponding receiving MS's for the in-memory connection.

In an embodiment, at 332, the inter-microservice communication router routes the message in the first format to at least one additional receiving MS associated with the in-memory connection.

In an embodiment, the inter-microservice communication router processes and provides through the processing one or more services to a transaction terminal during a transaction by providing inter-communications to the microservices that is platform and hardware agnostic or independent.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   providing inter communications between microservices of different platforms using in-memory mapping that comprise port assignments and plugins for the microservices to process the inter communications;
   receiving an inter communication message from a first microservice of a first platform;
   routing the inter communication message to a second microservice of a second platform and activating a certain plugin of the second platform using the in-memory mapping and
   providing and managing the inter communications between the microservices as a single service provided through a cloud processing environment, wherein each microservice provides at least one operation or at least one function of the single service.

2. The method of claim 1, wherein receiving further includes monitoring ports and identifying based on a certain port from the in-memory mapping the first microservice attempting to send the inter communication message.

3. The method of claim 2, wherein routing further includes identifying the certain plugin and the second microservice based on the certain port from the in-memory mapping.

4. The method of claim 3, wherein routing further includes receiving output from the certain plugin in response to the inter communication message and delivering the output to the second microservice.

5. The method of claim 3, wherein routing further includes providing the inter communication message to the certain plugin in a first format, receiving the inter communication message in a second format from the certain plugin, and providing the inter communication message in the second format to the second microservice.

6. The method of claim 1, wherein providing and managing further includes providing the single service as a transaction service, a loyalty service, a reservation service, a payment service, or a security service.

7. The method of claim 6, wherein providing the single service further includes activating the single service from the cloud processing environment when the single service is initiated on a transaction terminal.

8. The method of claim 7, wherein activating further includes identifying the transaction terminal as an automated teller machine, a self-service terminal, a point-of-sale terminal, or a kiosk.

9. The method of claim 1, wherein providing further includes maintaining unique identifiers for each microservice and each thread or instance of a given microservice to identify each microservice and each thread or instance of the given microservice accessing a given port associated with the in-memory mapping.

10. A method, comprising:
providing inter communications between microservices of different platforms using in-memory mapping that comprise port assignments and plugins for the microservices to process the inter communications;
receiving an inter communication message from a first microservice of a first platform; and
routing the inter communication message to a second microservice of a second platform and activating a certain plugin of the second platform using the in-memory mapping, wherein routing further includes activating one or more additional plugins based on the in-memory mapping.

11. A method, comprising:
providing microservices that process in different processing environments, each microservice can process as separate instances or separate threads within the different environments, each microservice and any of its corresponding separate instances or separate threads processes at least one operation or at least one function of a single service provided from a cloud processing environment;
maintaining unique identifiers for each microservice and any of its corresponding separate instances or separate threads, wherein maintaining the mapping further includes maintaining port assignments for the inter microservice communications within the mapping based on the unique identifier, wherein maintaining the mapping further includes maintaining plugins to activate during inter microservice communications for the port assignments within the mapping;
maintaining a mapping between the microservices for inter microservice communications; and
routing the inter microservice communications using the mapping during processing of the single service from the cloud processing environment.

12. The method of claim 11, wherein maintaining the mapping further includes maintaining at least one port assignment with multiple plugins for the inter microservice communications within the mapping.

13. The method of claim 11, wherein providing further includes initiating the microservices and any instances or thread of a given microservice within the different processing environments when the single service is called from a terminal.

14. The method of claim 13, wherein initiating further includes identifying the terminal as an automated teller machine being started, a self-service terminal being started, a point-of-sale terminal being started, or a kiosk being started.

15. The method of claim 11 further comprising, providing the single service from the cloud processing environment as a transaction service, a security service, a reservation service, a financial service a payment service, or a loyalty service.

16. A system, comprising:
at least one service that comprises at least one processor;
the at least one processor executes instructions that cause the at least one processor to perform operations comprising:
providing microservices that processing within different processing environments, each microservice performs at least one operation or at least one function of a transaction service;
providing access to the transaction service over a cloud processing environment to transaction terminals;
initiating the microservices for transactions initiated on the transaction terminals;
maintaining an in-memory mapping for inter microservice communications during operation of the microservices for the transactions; and
routing the inter microservice communications during the transaction using the in-memory mapping to process the transactions on behalf of the transactions terminals from the cloud processing environment as the transaction service;
wherein the transaction terminals are one or more of automated teller machines, self-service terminals, point-of-sale terminals, and kiosks.

* * * * *